US012689773B2

(12) United States Patent (10) Patent No.: US 12,689,773 B2

Richter et al. (45) Date of Patent: Jul. 21, 2026

(54) APPARATUS AND METHOD FOR ENCODING A PICTURE REGARDING A REGION OF INTEREST

(71) Applicant: Fraunhofer-Gesellschaft zur Förderung der angewandten Forschung e.V., Munich (DE)

(72) Inventors: Thomas Richter, Erlangen (DE); Siegfried Fößel, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 1 day.

(21) Appl. No.: 18/883,849

(22) Filed: Sep. 12, 2024

(65) Prior Publication Data

US 2026/0075259 A1 Mar. 12, 2026

(51) Int. Cl.
H01L 29/94 (2006.01)
G06T 5/70 (2024.01)
(Continued)

(52) U.S. Cl.
CPC .............. H04N 19/91 (2014.11); G06T 5/70 (2024.01); H04N 19/124 (2014.11); H04N 19/625 (2014.11)

(58) Field of Classification Search
CPC .... H04N 19/91; H04N 19/124; H04N 19/625; G06T 5/70
See application file for complete search history.

(56) References Cited

U.S. PATENT DOCUMENTS

| | | | |
|---|---|---|---|
| 11,962,765 B1 * | 4/2024 | Sánchez De La Fuente ............... | H04N 19/70 |
| 2003/0108099 A1 * | 6/2003 | Nagumo ................... | G06T 9/20 |
| | | | 375/E7.199 |

(Continued)

OTHER PUBLICATIONS

International Telecommunication Unition; "Series T: Terminals for Telematic Services, Information technology—JPEG 2000 image coding system: Core coding system;" T.800, Aug. 2002, ITU-T, Telecommunication Standardization Sector of ITU; Aug. 2002; pp. 1-212.

(Continued)

*Primary Examiner* — Joseph Suh

(74) *Attorney, Agent, or Firm* — McClure, Qualey & Rodack, LLP

(57) ABSTRACT

An apparatus for encoding a sample array which signals a spatially sampled representation of a picture, wherein the apparatus is configured for: spectrally decomposing the sample array to obtain a decomposed representation, the decomposed representation comprising a plurality of coefficients, each of which is attributed to one of a plurality of spectral components of the decomposed representation and to one of a plurality of spatial components of the sample array; obtaining, from the plurality of coefficients, a subset of coefficients which are, according to the spatial components to which the coefficients are attributed, located outside of a predetermined region spatially defined within the sample array; attenuating the coefficients of the subset of coefficients, wherein an extent of an attenuation of a coefficient of the subset of coefficients depends on the spatial component to which the coefficient is attributed.

24 Claims, 4 Drawing Sheets

(51) Int. Cl.
    *H04N 19/124*     (2014.01)
    *H04N 19/625*     (2014.01)
    *H04N 19/91*     (2014.01)

(56)           References Cited

U.S. PATENT DOCUMENTS

| | | | |
|---|---|---|---|
| 2005/0141773 A1* | 6/2005 | Mizuno | H04N 19/154 |
| | | | 375/E7.059 |
| 2015/0302252 A1* | 10/2015 | Herrera | G06V 40/70 |
| | | | 382/117 |
| 2017/0200296 A1* | 7/2017 | Jones | G09G 5/02 |
| 2018/0070007 A1* | 3/2018 | Molgaard | G06V 10/28 |
| 2018/0227579 A1 | 8/2018 | Shen | |
| 2018/0262758 A1 | 9/2018 | El-Ghoroury | |
| 2018/0376153 A1* | 12/2018 | Gokhale | H04N 19/147 |
| 2019/0026864 A1* | 1/2019 | Chen | G06T 3/4053 |
| 2021/0044742 A1* | 2/2021 | Berkovich | H04N 23/955 |
| 2021/0099719 A1* | 4/2021 | Zhou | H04N 19/174 |
| 2022/0036515 A1* | 2/2022 | Lee | H04N 19/18 |
| 2023/0298197 A1* | 9/2023 | Agrawal | G06T 7/70 |
| | | | 345/174 |

OTHER PUBLICATIONS

International Telecommunication Union; "Series T: Terminals for Telematic Services, Information technology—JPEG 2000 image coding system: Extensions;" T.801, Aug. 2002, ITU-T, Telecommunication Standardization Sector of ITU; Aug. 2002; pp. 1-334.

International Standard; "Information technology—JPEG XS low-latency lightweight image coding system Part 1: Core coding system;" ISO/IEC 21122-1; May 2019; pp. 1-78.

Wandell, B; "Foundations of Vision;" Stanford University; Oct. 1995 https://wandell.github.io/FOV-1995/.

Purves, D., et al.; "Neuroscience, 3rd edition;" Sinauer Associates; 2004; pp. 1-832 https://p.ucsd.edu/~mboyle/COGS107a/pdf-files/Neuroscience.pdf.

International Search Report and Written Opinion dated Dec. 1, 2025, issued in application No. PCT/EP2025/075688.

N'guessan, S.O., et al.; "Compression of HD videos by a contrast-based human attention algorithm;" 2014 IEEE 16th International Workshop on Multimedia Signal Processing (MMSP), IEEE; Sep. 2014; pp. 1-6.

* cited by examiner

APPARATUS AND METHOD FOR ENCODING A PICTURE REGARDING A REGION OF INTEREST

TECHNICAL FIELD

Embodiments of the present invention relate to an apparatus for encoding a picture. Further embodiments relate to a method for encoding a picture. In particular, embodiments may relate to region of interest coding, e.g., foveated region of interest coding.

BACKGROUND OF THE INVENTION

Transmission of image signals to AR (augmented reality)/VR (virtual reality)/XR (extended reality) glasses (hereinafter referred to as virtual reality glasses for simplicity) requires high quality with low latency to avoid simulator sickness, and high compression performance to avoid bulky cabling of the glasses or even enable wireless transmission of the signal.

Accordingly, it would be desirable to provide a concept for encoding a picture which provides an improved tradeoff between a low bitrate of the encoded picture data and a high quality of the decoded picture as precepted by a user.

SUMMARY

Embodiments of the present invention provide an apparatus for encoding (e.g., into a data stream) a sample array which signals a spatially sampled representation of a picture. The apparatus is configured for spectrally decomposing (or transforming) the sample array (e.g., using a spatial to spectral transformation, e.g., DCT or DWT) to obtain a decomposed representation, the decomposed representation comprising a plurality of coefficients, each of which is attributed to one (e.g., a respective one) of a plurality of spectral components of the decomposed representation and to one (e.g., a respective one) of a plurality of spatial components of the sample array (e.g., a spatial position or a spatial portion of the sample array). The apparatus is further configured for obtaining (e.g., identifying among, determining), from the plurality of coefficients, a subset of coefficients which are, according to the spatial components to which the coefficients are attributed, located outside of a predetermined region (e.g., a region of interest) spatially defined within the sample array. The apparatus is further configured for attenuating the coefficients (e.g., attenuating an amplitude of the coefficients) of the subset of coefficients, wherein an extent of an attenuation of a coefficient of the subset of coefficients depends on the spatial component to which the coefficient is attributed (e.g., to obtain an attenuated subset of coefficients).

Embodiments of the present invention rely on the idea to exploit the properties of the human visual system to achieve an improved tradeoff between the bitrate of an encoded image and the perception of the decoded image by a user. To this end, embodiments of the invention exploit the circumstance that the spatial resolution of the human visual system is only able to see images at highest resolution in a relatively narrow field of view, namely the image regions that are mapped to the fovea (fovea centralis) of the retina of the human eye. Regions outside of the fovea are still seen, and also important for the visual reception of an image, but spatial resolution (acuity) of the visual system rapidly declines outside of the fovea. For example, eye-tracking mechanisms within virtual reality glasses may be used to assess the salient region of the image. According to embodiments of the invention, a subset of coefficients of a spectrally decomposed representation of the picture, which are attributed to, e.g., contribute to, spatial components of the picture outside of a predetermined region, also referred to as region of interest, are attenuated, which allows bitrate savings in the encoding of these coefficients. For a given available bitrate, these savings may, for example, be allocated to the encoding of the coefficients of the region of interest, what may, in examples, result in a finer quantization in the region of interest compared to the remaining part of the picture. As a consequence, the attenuation of coefficients outside the region of interest may result in a higher resolution and/or a higher quality of the decoded picture in the region of interest, while the user will not perceive the reduced resolution outside of the region of interest due to the properties of the human eye. In particular, embodiments rely on the idea that an extent of the attenuation of a coefficient of the subset depends on the spatial component to which the coefficient is attributed. The spatial dependency of the attenuation allows to modulate the attenuation in accordance with the perception of the human visual system so that a perception of the attenuation of the coefficients of the subset by the user may be reduced or even avoided. For example, the attenuation may depend on a distance between the spatial component to which the coefficient is attributed and the region of interest.

According to an embodiment, the apparatus is configured for obtaining the subset of coefficients so that the coefficients of the subset of coefficients are attributed to a predetermined spectral component of the plurality of spectral components, e.g., one of one or more predetermined spectral components, e.g., one of one or more high-frequency spectral components.

In other words, according to an embodiment, the apparatus is configured for obtaining the subsets of coefficients from the plurality of coefficients by obtaining, or identifying, the coefficients from the plurality of coefficients, which are (i) attributed to the predetermined spectral component and (ii) located outside of the predetermined region according to the spatial components to which the coefficients are attributed.

In yet other words, according to an embodiment, the coefficients of the subset are (i) attributed to the predetermined spectral component (e.g., attributed to one of one or more predetermined spectral components) and (ii) located outside of the predetermined region according to the spatial components to which the coefficients are attributed.

Thus, for example, embodiments may provide a mechanism that allows to spatially modulate the spatial resolution of a transform-based (e.g., DCT or wavelet-based, i.e. a spatial-to-frequency transformation) image compression method such that a selected arbitrarily shaped image region is encoded in higher resolution, e.g. full resolution, but resolution gradually decays outside of the selected area. As areas of reduced spatial resolution do not contain high frequency components, such frequency components do not need to be transmitted, they possibly do not account for the rate of the entire image. A rate control algorithm ensuring constant bitrate for the image may thus allocate less rate to image regions of reduced spatial resolution, and invest the gained rate to improve the quality of the image regions within the selected area.

For example, embodiments allow an image compression algorithm to modulate the spatial resolution such that the full resolution remains available to the image areas that are mapped to the fovea, but areas outside of the fovea are only compressed with reduced resolution. Due to the reduced acuity of the human vision outside of the fovea, lowered spatial resolution remains invisible to the observer, but enabled better compression of the central part or allows reduction of the bitrate overall.

Further embodiments of the present invention provide a method for encoding (e.g., into a data stream) a sample array which signals a spatially sampled representation of a picture. The method comprises spectrally decomposing (or transforming) the sample array (e.g., using a spatial to spectral transformation, e.g., DCT or DWT) to obtain a decomposed representation, the decomposed representation comprising a plurality of coefficients, each of which is attributed to one of a plurality of spectral components of the decomposed representation and to one of a plurality of spatial components of the sample array (e.g., a spatial position or a spatial portion of the sample array). The method further comprises obtaining (e.g., identifying among, determining), from the plurality of coefficients, a subset of coefficients which are, according to the spatial components to which the coefficients are attributed, located outside of a predetermined region (e.g., a region of interest) spatially defined within the sample array. The method further comprises attenuating the coefficients (e.g., attenuating an amplitude of the coefficients) of the subset of coefficients, wherein an extent of an attenuation of a coefficient of the subset of coefficients depends on the spatial component to which the coefficient is attributed (e.g., to obtain an attenuated subset of coefficients).

Another embodiment may have a non-transitory computer readable storage medium having stored a computer program for causing a computer to perform the method for encoding a sample array as mentioned above.

Further advantageous embodiments are subject of the dependent claims.

BRIEF DESCRIPTION OF THE DRAWINGS

Embodiments of the present disclosure are described in more detail below with respect to the figures, among which.

DETAILED DESCRIPTION OF THE INVENTION

Embodiments of the present invention are now described in more detail with reference to the accompanying drawings, in which the same or similar elements or elements that have the same or similar functionality have the same reference signs assigned or are identified with the same name. In the following description, a plurality of details is set forth to provide a thorough explanation of embodiments of the disclosure. However, it will be apparent to one skilled in the art that other embodiments may be implemented without these specific details. In addition, features of the different embodiments described herein may be combined with each other, unless specifically noted otherwise.

Figure 1:
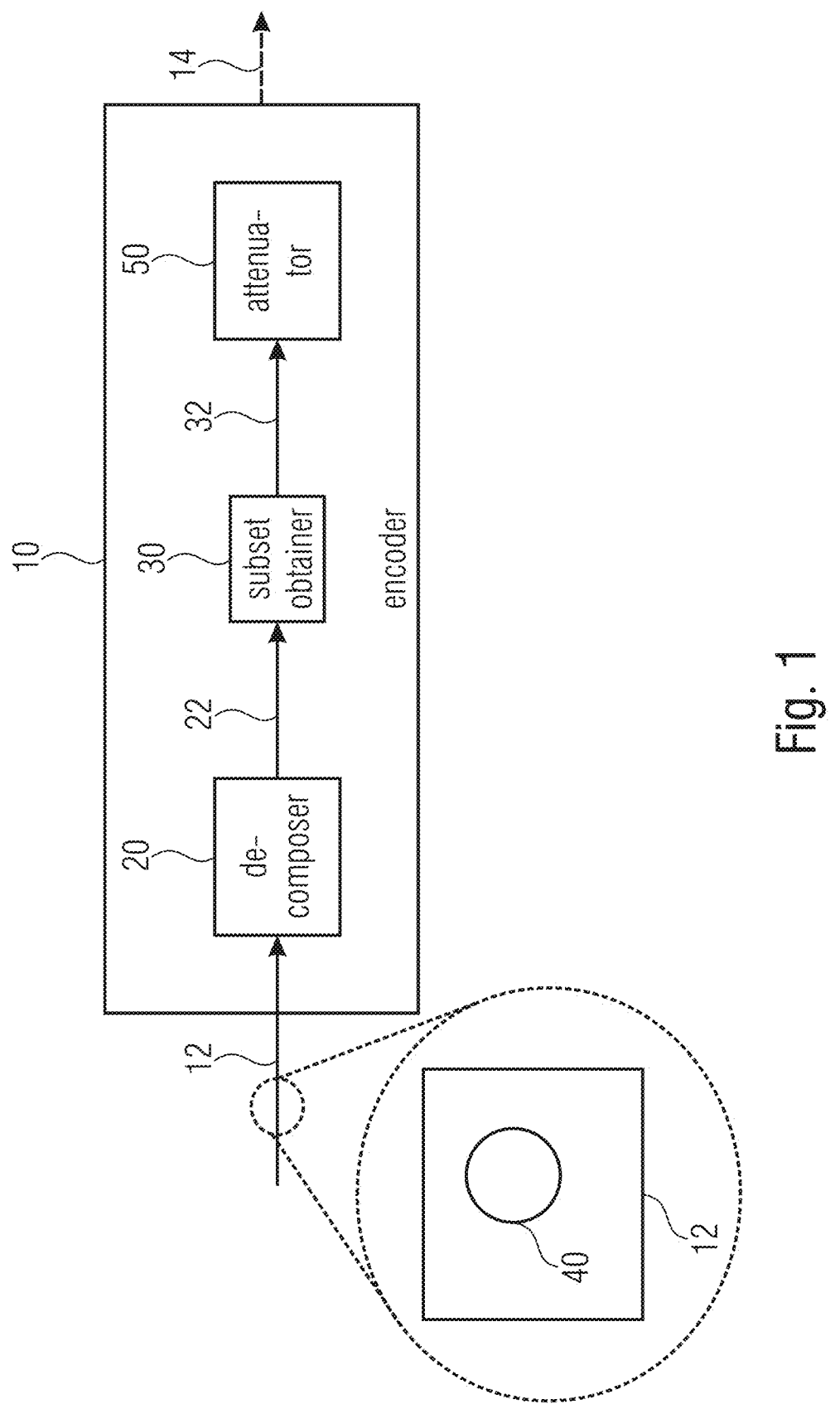
FIG. 1 illustrates an encoder according to an embodiment.

FIG. 1 illustrates an apparatus 10 for encoding a sample array 12. Apparatus 10 may be referred to as encoder. For example, encoder 10 encodes the sample array 12 into a data stream 14, which is illustrated in FIG. 1 as optional feature. The sample array 12 signals a spatially sampled representation of a picture. For example, the sample array 12 is a 2D array of sample positions, each sample position having associated therewith one or more sample values, also referred to as samples. Encoder 10 comprises a decomposer 20, which spectrally decomposes the sample array 12 to obtain a decomposed representation 22 of the sample array 12. The decomposed representation 22 comprises a plurality of coefficients, each of which is attributed to one of a plurality of spectral components of the decomposed representation and to one of a plurality of spatial components of the sample array. For example, a spatial component may represent a spatial position or a spatial portion of the sample array. For example, the attribution of coefficients to spatial components may be defined such that the spatial component, to which a coefficient is attributed, represents a portion of the sample array 12, e.g., one or more sample positions of the sample array 12, the samples of which portion contribute to the coefficient. From the plurality of coefficients of the decomposed representation 22, encoder 10 obtains, see block 30 of FIG. 1, a subset 32 of coefficients which are, according to the spatial components to which the coefficients are attributed, located outside of a predetermined region 40, e.g., a region of interest, spatially defined within the sample array 12. The encoder 10 further comprises an attenuator 50, which attenuates the coefficients of the subset of coefficients. For example, attenuator 50 attenuates an amplitude of the coefficients. In the attenuation performed by attenuator 50, an extent of the attenuation of a coefficient of the subset of coefficients depends on the spatial component to which the coefficient is attributed. For example, an extent of the attenuation of each of the coefficients of the subset 32 depends on the respective spatial component to which the respective coefficient is attributed. For example, the attenuation of the coefficients of the subset 32 results in a set of attenuated coefficients, e.g., later on referred to with reference sign 52 in FIG. 2.

For example, the decomposer 20 subjects the sample array 12 to a transformation, e.g., a spatial-to-spectral transformation, e.g., a discrete wavelet transformation, DWT, or a discrete cosine transformation, DCT, or a discrete sine transformation, DST.

Examples of the decomposed representation 22 and the attribution of coefficients to spatial and spectral components will be described later with respect to FIG. 3 and FIG. 4.

As illustrated in FIG. 1, the predetermined region 40 may be circular or elliptic according to an embodiment. A circular region of interest matches the shape of the human fovea so that the attenuation of coefficients is particularly well adapted to the human perception. In other embodiments, the predetermined region 40 may have a non-circular shape. For example, the predetermined region 40 may be rectangular, e.g., quadratic. A rectangular region of interest may benefit from an easy implementation.

For example, encoder 10 may encode the attenuated coefficients into the data stream 14. Additionally, encoder 10 may encode the coefficients of the region of interest 40, i.e., coefficients of the decomposed representation which are, according to the spatial components to which the coefficients are attributed, located within the predetermined region 40, into the data stream 40.

For example, coefficients of the decomposed representation which are, according to the spatial components to which the coefficients are attributed, located within the predetermined region 40, may be left unaffected by the attenuation performed by attenuator 50. In other words, the coefficients being attributed to the predetermined region 50 may be encoded into the data stream 14 without being attenuated or without their amplitude being manipulated prior to encoding.

According to an embodiment, encoder 10 may obtain the subset of coefficients so that the coefficients of the subset of coefficients are attributed to a predetermined spectral component of the plurality of spectral components, e.g., to one of one or more predetermined spectral components of the plurality of spectral components, of the decomposed representation.

In other words, according to an embodiment, the subset 32 does not include all coefficients attributed to the region of interest, but merely those which are attributed to one of one or more predetermined spectral components.

In other words, the attenuation 50 may be frequency-selective. For example, the one or more predetermined spectral components may be high-frequency components. For example, the one or more predetermined spectral components may represent the highest frequency range among the spectral components of the decomposed representation. For example, further spectral components of the decomposed representation may represent lower frequencies than the one or more predetermined spectral components.

In other words, the attenuation 50 may have the effect of a low-pass filter for the coefficients belonging to the subset 32, wherein the extent of the attenuation of high-frequency components may depend on a distance of the respective coefficient from the region of interest 40.

As the human visual system is not able to resolve high frequencies outside of the central field of view, the attenuation of high frequency components does not change the perception of the user of an XR device such as VR glasses.

According to an embodiment, the extent of the attenuation of a coefficient of the subset 32 depends on a distance between the spatial component, to which the coefficient is attributed, and the predetermined portion.

For example, the distance is measured between a location of the spatial component, to which the coefficient is attributed, within the sample array 12 and a border of the predetermined portion 40.

For example, the distance is measured as a Cartesian distance.

According to an embodiment, attenuator 50 attenuates a first coefficient of the subset, which is attributed to a spatial component having a larger distance to the predetermined portion 40 than a spatial component associated to a second coefficient of the subset 32, more than the second coefficient, i.e., the attenuation of the first coefficient is larger than the attenuation of the second coefficient.

In other words, attenuator 50 may, in attenuating the coefficients of the subset of coefficients, attenuate a first coefficient of the subset, which is attributed to a spatial component having a first distance to the predetermined portion by a first factor, and attenuating a second coefficient of the subset, which is attributed to a spatial component having a second distance to the predetermined portion, which is smaller than the first distance, by a second factor, which is smaller than the first factor.

According to an embodiment, the extent of the attenuation gradually increases with increasing distance of the spatial component, to which the coefficient to be attenuated is attributed, to the predetermined portion 40. For example, the attenuation may increase in multiple steps, e.g. in 8 or 16 steps.

According to an embodiment, attenuator 50 may, in attenuating the coefficients of the subset 32, set a coefficient attributed to a spatial component, the distance of which to the predetermined region exceeds a predetermined threshold, to a predetermined value, e.g., a value below a quantization threshold, e.g., to zero.

According to an embodiment, attenuator 50 may perform the attenuation by multiplying the coefficient to be attenuated by a factor, the size of which depends on the distance between the spatial component to which the coefficient is attributed and the predetermined portion 40. For example, according to this embodiment, the factor may be zero for a coefficient, the distance of which to the predetermined portion 40 exceeds a predetermined threshold. For example, the factor may be in a range between 1 and 0.

Performing the attenuation by multiplication with a factor provides a low-complex way of attenuating the coefficients in dependence on the distance.

According to an embodiment, the multiplication with the factor may be performed by subjecting the coefficient to a bit-shift operation, e.g., a right-shift, by a bitcount that depends on the distance of the coefficient from the predetermined region 40. For example, the bitcount of the bitshift may go to infinity with increasing distance.

Figure 2:
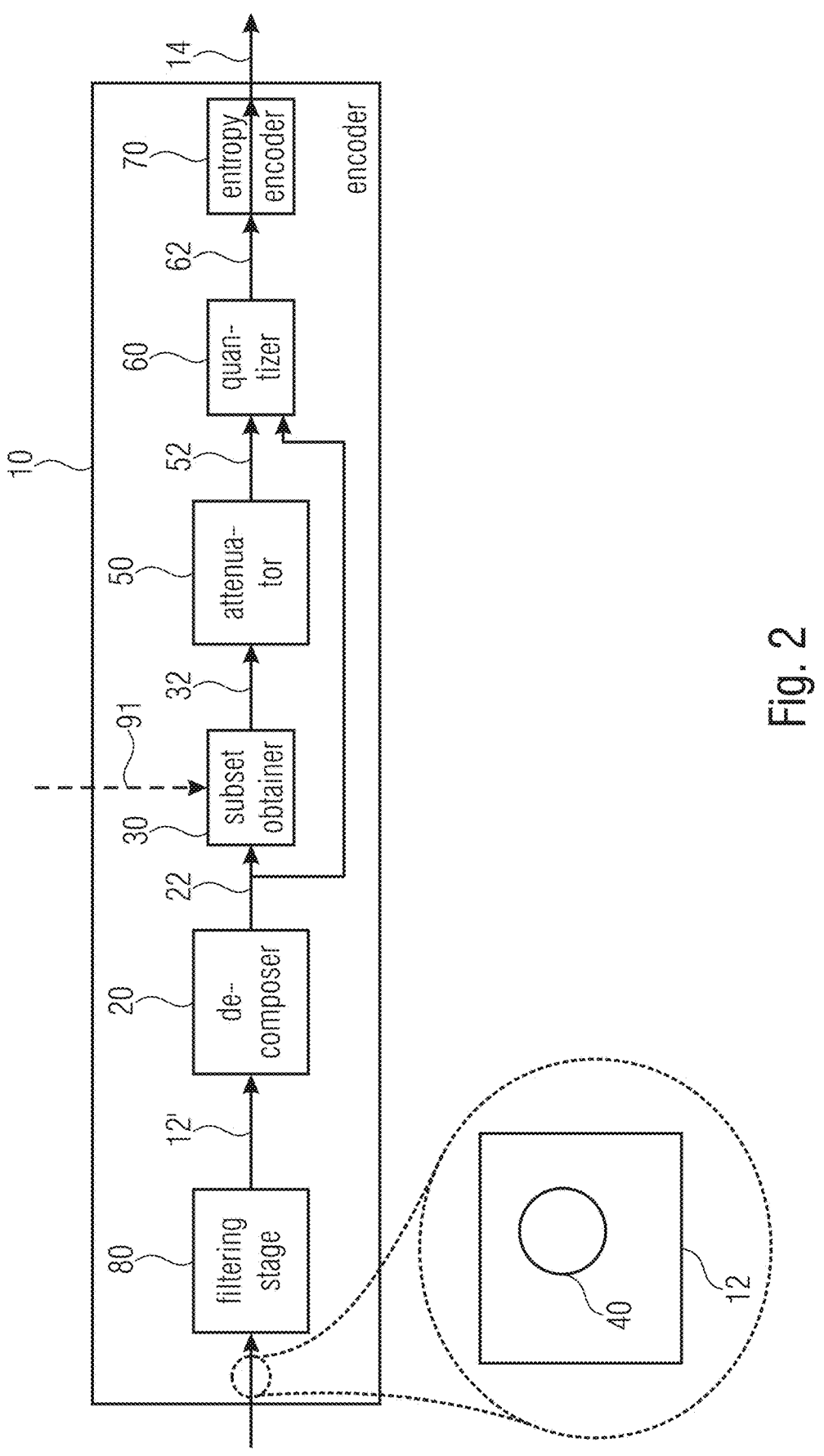
FIG. 2 illustrates an encoder according to another embodiment.

FIG. 2 illustrates further optional features of encoder 10 according to embodiments, which may optionally be combined individually with any on the embodiments described with respect to FIG. 1.

According to an embodiment, encoder 10 further comprises a quantizer 60 configured for quantizing the attenuated coefficients 52 of the subset 32 to obtain quantized coefficients 62. Quantizer 60 may further quantize the coefficients of the plurality of coefficients which do not belong to the subset 32, e.g., which belong to the predetermined region and/or which are attributed to a spectral component not to be attenuated.

Quantization of the attenuated coefficients 52 may yield many zeros, which may be encoded into few bits, for example, when using entropy encoding.

According to an embodiment, encoder 10 further comprises an entropy encoder 70, which encodes the quantized coefficients 62 using entropy encoding, e.g., arithmetic encoding.

According to an embodiment, quantizer 60 may vary a quantization parameter, e.g., a quantization step size spatially.

For example, encoder 10 may comprise a rate controller, which controls the quantization step size according to one or more criteria. For example, the criteria may include one or more of (i) the bitrate for the entire picture being within a predefined range, (ii) meeting a predefined value and/or a buffer neither overflowing nor underflowing, or (iii) providing a constant bitrate over an output channel at which the data stream 14 is provided. In examples, the rate controller may take into account a portion of the picture, e.g., multiple lines of the sample array 12, for setting a quantization step size. Thus, in case of a bitrate reduction due to many coefficients of the subset 32 being set to zero, the rate controller may decrease the quantization step size, thereby making sure that the available bitrate and buffer capacity is exploited. As a consequence, the resolution of non-zero coefficients will increase, what may result in a higher quality of the predetermined region 40.

According to an embodiment, encoder 10 may comprise a filtering stage 80, which is configured for filtering samples (or sample values) of the sample array 12, which samples are located outside of the predetermined region 40, using a blurring filter, or unsharpening filter or softening filter, e.g., a Gaussian filter, prior to spectrally decomposing the sample array to obtain a filtered version 12' of the sample array. In other words, the filtering 80 is performed in the spatial domain, i.e., prior to the spectral decomposition 20. In contrast, the attenuation 50 is performed on the coefficients of the decomposed representation 22. In case of implementing the filtering stage 80, the spectral decomposition 20 to obtain the decomposed representation 22 may be performed on the filtered version 12' of the sample array 12.

According to an embodiment, a blurring intensity of the blurring filter varies in dependence on a spatial distance between samples to be filtered and the predetermined portion 40, e.g., between a location of the respective samples within the sample array and a border of the predetermined portion.

According to an embodiment, the blurring filter is a Gaussian filter, wherein a spatial width of the Gaussian filter depends on a spatial distance between samples to be filtered and the predetermined portion.

According to an embodiment, the Gaussian filter is a 5-tap FIR filter whose filter strength increases with increasing distance from the region of interest. In one specific implementation the filter strength can follow the density of the cones of the human eye.

It is noted that the filtering 80, the quantizer 60 and the entropy encoder 70 may be implemented in encoder 10 independently from each other and independent of the further features described with respect to FIG. 2 in the following.

According to an embodiment, encoder 10 is configured for obtaining an indication 91 of the predetermined region 40. For example, encoder 10 may receive the indication, e.g., from a user device, e.g. a VR or AR device.

According to an embodiment, the predetermined region is determined by a user device by eye-tracking of a user of the user device.

According to an embodiment, the data stream 14, into which the sample array is encoded, is dedicated for being decoded by a virtual reality device, e.g., VR glasses or AR glasses.

In other words, embodiments of the invention can be applied in the transmission of high-resolution images from a computer system to virtual reality glasses (such as the Occulus Rift) where the image region to be transmitted in full resolution is obtained from an eye-tracker within the glasses.

However, further embodiments of the invention may be applied in other areas which fall in the domain of "region of interest coding", for example photography or eCommerce where the attraction of the observer shall be steered to a central object in the image by unsharpening image areas outside of a particular area (e.g. face or object) of the image.

In the following, examples of the decomposed representation 22 will be described.

Figure 3:
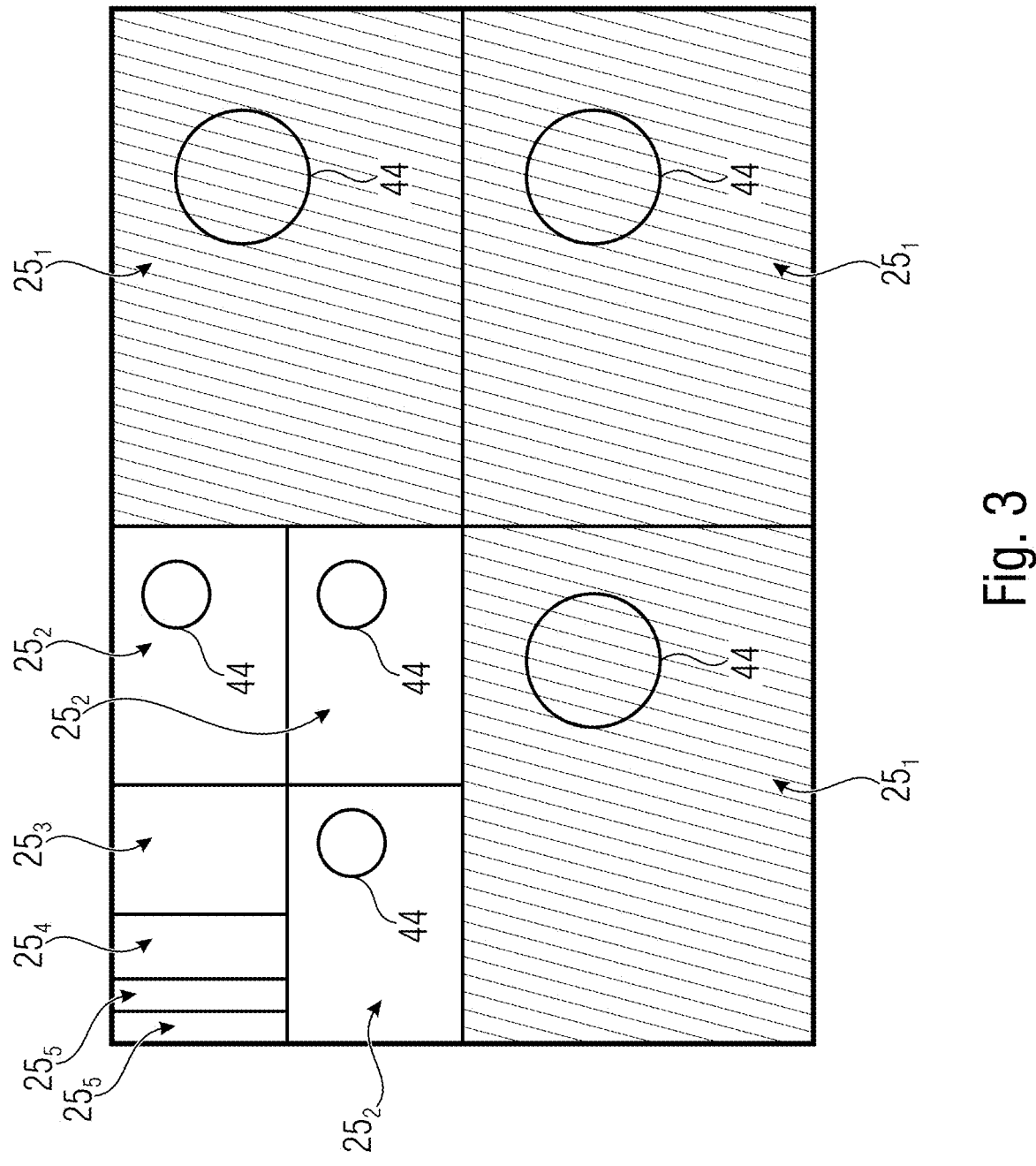
FIG. 3 illustrates a decomposed representation obtained by a wavelet transformation according to an embodiment.

FIG. 3 illustrates an example of a decomposed representation 22 according to an embodiment. According to this embodiment, the decomposer 20 subjects the sample array to a DWT to obtain the decomposed representation. The DWT may include a plurality, or a sequence, of wavelet transformations, which may be referred to as levels of the DWT. For example, each of the wavelet transformations is performed using a respective wavelet in a respective transform direction (e.g., horizontally or vertically) to obtain a transformed representation 25. Thus, each of the transformed representations 25 represents a spectral component of the decomposed representation 22. The transformed representations 25 are exemplarily illustrated in in FIG. 3 by transformed representations $25_1$, $25_2$, $25_3$, $25_4$, $25_5$. Each of the transformed representation may be obtained by a respective number of one or more wavelet transformations applied to the sample array 12, or to a preceding transformed representation of the sequence of transformations.

For example, each transformed representation 25 comprises a plurality of coefficients of the plurality of coefficients of the decomposed representation 22. For example, each transformed representation 25 may comprise a 2D array of coefficients, the coordinates of the coefficients within the transformed representations representing spatial information about the sample array 12. In other words, the attribution of a coefficient to a spatial component of the sample array 12 may, in case of the spectral decomposition 50 being performed by DWT, be given by the position of the coefficient with the transformed representation 25 to which the coefficient belongs. For example, in transforming the sample array 12 using a wavelet, the predetermined region 40 may be mapped to regions 44 of the transformed representations, as exemplarily illustrated in FIG. 3 for transformed representations $25_1$, $25_2$. In other words, the regions 44 may include coefficients which carry contributions of the predetermined region 40. For example, coefficients in the regions 44 illustrated in FIG. 3 may indicate spatial components of the decomposed representation 22, which are associated with the predetermined region 40 of the sample array.

For example, the transformed representations 25, may have different sizes, i.e., different numbers of transform coefficients, depending on the number of subsequently applied DWTs and/or the used wavelets and/or the transform direction. In the illustrative example of FIG. 3, transformed representations $25_2$ may have been derived from transformed representations $25_1$ by horizontal and vertical DWTs, and transformed representations $25_3$ may have been derived from one of the transformed representations $25_2$ by means of a horizontal DWT. For example, transformed representations $25_1$ may represent higher frequency components, while subsequent transformed representations may represent lower frequency components.

As mentioned, each of the transformed representations 25 may be associated with a respective spectral component, e.g., depending on the wavelet using which the transformed representation was obtained. For example, each spectral component is characterized by, or associated with, a frequency band and/or a transform direction of the respective wavelet. The size of the transformed representations 25, i.e., the number of coefficients of the transformed representations, may depend on a frequency associated with the transformed representations 25. To be more precise, a transformed representation 25 representing a low frequency spectral component may be represented by a lower number of transform coefficients than a transformed representation 25 representing a high frequency spectral component. For example, in FIG. 3, the shaded representations $25_1$ may represent the highest out of the represented frequency bands. Thus, attenuating high frequency components may result in high bitrate savings.

According to an embodiment, encoder 10 is configured to encode the sample array into a data stream conformant to the JPEG XS standard (ISO/IEC 21122-1), and accordingly, the spectral decomposition 50 is a DWT and the quantization 60 and entropy coding 70 steps are those described by the JPEG XS standard (ISO/IEC 21122-1).

According to an embodiment conformant to JPEG XS, only the largest three highpass bands (HL, LH and HH) for a 1-vertical level wavelet decomposition of the DWT applied according to JPEG XS are affected by the attenuation of attenuator 50. In another embodiment, only the largest six highpass bands (HL, LH and HH of the first and second wavelet decomposition) of the DWT applied in JPEG XS are affected for 2-vertical level wavelet decomposition.

Figure 4:
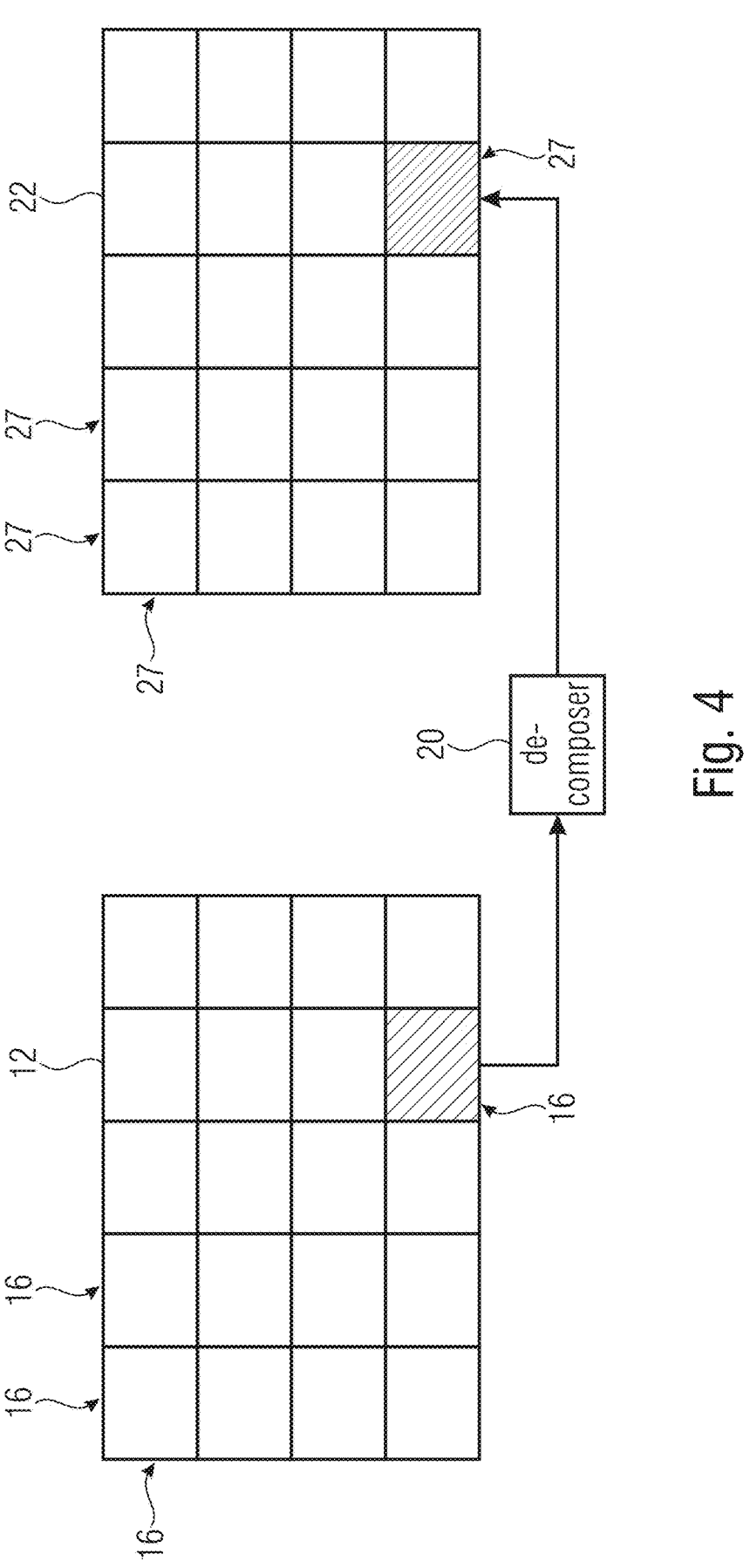
FIG. 4 illustrates a decomposed representation obtained by a portion-wise spatial-to-spectral transformation according to an embodiment.

FIG. 4 illustrates another embodiment of the decomposed representation 22. According to this embodiment, the spectral decomposition 50 is performed by a portion-wise or block-wise DCT or DST transformation. In other words, the sample array 12 may be subjected to a spatial-to-spectral transformation, e.g., a DCT or a DST, in units of portions 16 into which the sample array 12 may be divided as illustrated in FIG. 4. Thus, each of the portions 16 may be subjected to the spatial-to-spectral transformation to obtain a transformed portion 27, e.g., a transformed block, of the decomposed representation. The coefficients of one of the portions 27 may be attributed to spectral components according to their positions within the transformed blocks 27. In other words, each of the coefficients of one of the transformed blocks may be associated with a respective frequency and transform direction. In this case, each of the coefficients may represent a different combination of frequency and transform direction, so that each transform coefficient may represent an individual spectral component. According to this embodiment, the attribution of the coefficient to spatial components may be defined by their attribution to one of the portions 27, and accordingly, to one of the portions 16 of the sample array. In other words, all coefficients of one of the transformed blocks 27 may be attributed to one spatial component of the sample array 12, namely to the portion 16 from which the transformed portion 27 to which they belong is generated by means of the transformation.

For example, the portions 16 may be rectangular, e.g., quadratic, blocks. Optionally, the division of the sample array 12 into blocks may be regular, i.e., the portions 16 may be of equal size.

In other words, according to an embodiment, encoder 10 is configured for spectrally decomposing the sample array by subjecting the sample array 12 to a discrete sine transformation, DST, or a discrete cosine transformation, DCT, in units of portions 16 into which the sample array is subdivided to obtain the decomposed representation 22.

For example, for each of the portions, the spectral decomposition may yield a plurality of coefficients, each of which is associated with a respective spectral component (e.g., characterized by frequency and transform direction), and the coefficients may be attributed to a spatial component of the sample array according to the portion of the sample array, from the spectral decomposition of which they result from. In other words, according to this embodiment, the attribution to spatial components may be defined based on the subdivision of the sample array into portions, and coefficients resulting from the spectral decomposition of one of the portions are attributed to one spatial component, which is represented by the one portion.

In the following, further embodiments will be described.

An embodiment modifies the encoder of an image or video compression algorithm while ensuring that the created bitstream is still conforming to the specifications of the corresponding compression algorithm.

According to an embodiment, a compression algorithm according to an embodiment comprises, or consists of, the following steps:

1. Optionally pre-filtering the input image in the spatial domain by an unsharpen filer, e.g., filter 80 of FIG. 2, for example a five-tap Gaussian blur filter. This filter is not applied to the salient "region of interest" in the image, but its intensity is gradually increased the further pixels are away from the region of interest. For example, the Cartesian distance from the edge of the region of interest may be used to derive the standard variation $\sigma$ of the filter such that $\sigma$ gradually increases with increasing distance.

2. Filtering the spatial pixels by a spatial-to-frequency transformation, for example a DCT or DWT transformation, e.g. as performed by decomposer 20. The type of the transformation and its specific implementation depend on the encoder algorithm into which the described method is to be integrated, and this transformation is part of the regular encoder implementation.

3. Deriving from the spatial region of interest the set of coefficients in the transform domain, for example the wavelet domain, those coefficients that contribute to the region of interest.

4. Filtering (e.g., again) in the transform domain those coefficients that are outside of the region identified by the second step by a filter whose strength gradually increases with the distance from the region of interest, e.g., as performed by attenuator 50. For example, this filter shall only apply to the high-pass coefficients of the transform and shall leave the low-pass (in particular the DC coefficients) unaffected, and it shall be of such a type that high-pass coefficients whose distance from the region of interest is sufficiently large are set to zero. In one particularly simple implementation, the filter is a (one-tap) multiplication of the high-pass coefficients with a number that decays smoothly to zero outside of the region of interest, and is exactly zero sufficiently far from the region of interest.

5. The coefficients created by the above step may undergo a spatially modulated quantization as described by the image or video compression algorithm into which the method is to be integrated. The quantization may be controlled by a rate control algorithm aiming at a given constant bitrate and is described by the compression algorithm into which this invention is to be integrated.

6. The coefficients may undergo entropy coding, where the entropy coding algorithm is defined by the image or video compression algorithm into which the method is to be integrated.

The quantization step has the advantage that it creates zeros in a subset of the high-pass coefficients away from the region of interest, and such zeros are encoded very efficiently by the entropy coder in the last step. Thus, in combination with the rate allocation step controlling the quantization, rate that would be required to encode the highpasses outside of the region of interest may now be used to encode all data within the region of interest, improving the visual quality.

The first step is an optional step that improves the image quality outside of the region of interest by removing defects that are created by modifying selected high-pass coefficients within the fourth step. Its necessity depends on the filter used in this fourth step.

In the following, advantages over existing region of interest coding methods are discussed.

JPEG 2000 (ISO/IEC 15444-1) includes in its core coding specification a region-of-interest coding that works similarly to the disclosed invention. The so-called "Max-Shift" method multiplies those wavelet coefficients within the region of interest (salient image region) by a power of two that is larger than the maximal amplitude of the wavelet signal over the entire image and additionally transmits the exponent to the base of 2 to the decoder. The wavelet coefficients modulated this way are then transmitted to the decoder. The decoder uses the exponent to separate wavelet coefficients below and above the maximal wavelet amplitude implied by the exponent, and un-does the multiplication, regaining the original signal. However, as the JPEG 2000 encoder transmits image data bitplane by bitplane, starting at the highest populated bitplane, the wavelet coefficients within the region of interest are transmitted first, or depending on the target bitrate, are the only coefficients transmitted.

An alternative region-of-interest coding is described by JPEG 2000 part 2 (ISO/IEC 15444-2) which instead signals a rectangular or ellipsoid region by providing to the decoder coordinates such as the dimensions and shape of the regions of interest, and thus allows the decoder to identify the region of interest. The encoder again multiplies wavelet coefficients within the region of interest with a factor, but since the decoder has now additional side information which wavelet coefficients are within and which are outside of the region, this factor is no longer restricted to the maximal wavelet amplitude. This method therefore allows more freedom in the selection of the factor between coefficients within and outside of the region of interest, and thus a finer control of by how much the quality of the region of interest is improved over the background.

Note, however, that both methods require the transmission of additional side information to the decoder (the exponent and potentially the parameters describing the region of interest) and thus also require modifications of the encoding and decoding algorithm. Embodiments of the method described herein do not necessarily require any side information and may works on top of any image encoding algorithm that is based on a spatial-to-frequency transformation, such as the DCT or the DWT.

Furthermore, compared to the existing algorithms, embodiments of the present invention provide the advantage of an attenuation that depends on the spatial component. Accordingly, a smooth transition between the region of interest and the attenuated region may be achieved, which improves the visual perception.

Although some aspects have been described as features in the context of an apparatus it is clear that such a description may also be regarded as a description of corresponding features of a method. In particular, the block diagrams of FIG. 1 and FIG. 2 may serve as an illustration of respective methods, each of the blocks representing a step of a method.

Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded image signal can be stored on a digital storage medium or can be transmitted on a transmission medium such as a wireless transmission medium or a wired transmission medium such as the Internet. In other words, further embodiments provide a video bitstream product including the video bitstream according to any of the herein described embodiments, e.g. a digital storage medium having stored thereon the video bitstream.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus, the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Apparatus for encoding a sample array which signals a spatially sampled representation of a picture, wherein the apparatus is configured for spectrally decomposing the sample array to obtain a decomposed representation, the decomposed representation comprising a plurality of coefficients, each of which is attributed to one of a plurality of spectral components of the decomposed representation and to one of a plurality of spatial components of the sample array, obtaining, from the plurality of coefficients, a subset of coefficients which are, according to the spatial components to which the coefficients are attributed, located outside of a predetermined region spatially defined within the sample array, attenuating the coefficients of the subset of coefficients, wherein an extent of an attenuation of a coefficient of the subset of coefficients depends on the spatial component to which the coefficient is attributed, wherein the apparatus is configured for, in attenuating the coefficients, leaving coefficients attributed to a zero-frequency component unaffected.

2. Apparatus according to claim 1, configured for obtaining the subset of coefficients so that the coefficients of the subset of coefficients are attributed to a predetermined spectral component of the plurality of spectral components.

3. Apparatus according to claim 1, wherein the predetermined spectral component represents a frequency that is higher than a frequency represented by a further spectral component of the plurality of spectral components.

4. Apparatus according to claim 1, wherein the extent of the attenuation of the coefficient depends on a distance between the spatial component, to which the coefficient is attributed, and the predetermined portion.

5. Apparatus according to claim 1, wherein, in attenuating the coefficients of the subset of coefficients, an attenuation of a first coefficient of the subset, which is attributed to a spatial component having a larger distance to the predetermined portion than a spatial component associated to a second coefficient of the subset, is larger than an attenuation of the second coefficient.

6. Apparatus according to claim 1, configured for, in attenuating the coefficients, setting a coefficient attributed to a spatial component, the distance of which to the predetermined region exceeds a predetermined threshold, to a predetermined value.

7. Apparatus according to claim 1, configured for attenuating the coefficients of the subset by multiplying each of the coefficients of the subset with a factor which depends on the distance between the spatial component, to which the coefficient is attributed, and the predetermined portion.

8. Apparatus according to claim 1, further configured for quantizing the plurality of coefficients to obtain quantized coefficients, and entropy encoding the quantized coefficients.

9. Apparatus according to claim 8, configured for spatially varying a quantization parameter.

10. Apparatus according to claim 1, configured for spectrally decomposing the sample array using a discrete wavelet transformation, DWT to obtain the decomposed representation.

11. Apparatus according to claim 1, configured for spectrally decomposing the sample array by subjecting the sample array to a discrete sine transformation, DST, or a discrete cosine transformation, DCT, in units of portions into which the sample array is subdivided to obtain the decomposed representation.

12. Apparatus according to claim 1, configured for filtering samples of the sample array, which samples are located outside of the predetermined region, using a blurring filter prior to spectrally decomposing the sample array.

13. Apparatus according to claim 12, wherein a blurring intensity of the blurring filter varies in dependence on a spatial distance between samples to be filtered and the predetermined portion.

14. Apparatus according to claim 12, wherein the blurring filter is a Gaussian filter, wherein a spatial width of the Gaussian filter depends on a spatial distance between samples to be filtered and the predetermined portion.

15. Apparatus according to claim 1, configured for obtaining an indication of the predetermined region.

16. Apparatus according to claim 1, wherein the predetermined region is determined by a user device by eye-tracking.

17. Apparatus according to claim 1, configured for encoding the sample array into a data stream to be decoded by a virtual reality device.

18. Method for encoding a sample array which signals a spatially sampled representation of a picture, wherein the method comprises spectrally decomposing the sample array to obtain a decomposed representation, the decomposed representation comprising a plurality of coefficients, each of which is attributed to one of a plurality of spectral components of the decomposed representation and to one of a plurality of spatial components of the sample array, obtaining, from the plurality of coefficients, a subset of coefficients which are, according to the spatial components to which the coefficients are attributed, located outside of a predetermined region spatially defined within the sample array, attenuating the coefficients of the subset of coefficients, wherein an extent of an attenuation of a coefficient of the subset of coefficients depends on the spatial component to which the coefficient is attributed, wherein, in attenuating the coefficients, coefficients attributed to a zero-frequency component unaffected are left unaffected.

19. Method according to claim 18, further comprising:

filtering samples of the sample array, which samples are located outside of the predetermined region, using a blurring filter prior to spectrally decomposing the sample array.

20. Method according to claim 19, wherein a blurring intensity of the blurring filter depends on a distance between samples to be filtered and the predetermined portion.

21. A non-transitory computer readable storage medium having stored a computer program for causing a computer to perform the method according to claim 19.

22. Apparatus for encoding a sample array which signals a spatially sampled representation of a picture, wherein the apparatus is configured for spectrally decomposing the sample array to obtain a decomposed representation, the decomposed representation comprising a plurality of coefficients, each of which is attributed to one of a plurality of spectral components of the decomposed representation and to one of a plurality of spatial components of the sample array, obtaining, from the plurality of coefficients, a subset of coefficients which are, according to the spatial components to which the coefficients are attributed, located outside of a predetermined region spatially defined within the sample array, attenuating the coefficients of the subset of coefficients, wherein an extent of an attenuation of a coefficient of the subset of coefficients depends on the spatial component to which the coefficient is attributed, wherein the apparatus is configured for attenuating the coefficients of the subset by multiplying each of the coefficients of the subset with a factor which depends on the distance between the spatial component, to which the coefficient is attributed, and the predetermined portion.

23. Method for encoding a sample array which signals a spatially sampled representation of a picture, wherein the method comprises spectrally decomposing the sample array to obtain a decomposed representation, the decomposed representation comprising a plurality of coefficients, each of which is attributed to one of a plurality of spectral components of the decomposed representation and to one of a plurality of spatial components of the sample array, obtaining, from the plurality of coefficients, a subset of coefficients which are, according to the spatial components to which the coefficients are attributed, located outside of a predetermined region spatially defined within the sample array, attenuating the coefficients of the subset of coefficients, wherein an extent of an attenuation of a coefficient of the subset of coefficients depends on the spatial component to which the coefficient is attributed, wherein the method comprises attenuating the coefficients of the subset by multiplying each of the coefficients of the subset with a factor which depends on the distance between the spatial component, to which the coefficient is attributed, and the predetermined portion.

24. A non-transitory computer readable storage medium having stored a computer program for causing a computer to perform the method according to claim 23.

* * * * *